3,328,338
COMPOSITION OF MATTER AND METHOD OF PREPARATION
Harold V. R. Parish, Saginaw, Mich., assignor of forty percent to Frederick J. Stingel and twenty percent to Harold A. Cederberg, both of Saginaw, Mich.
No Drawing. Filed Aug. 8, 1962, Ser. No. 215,504
9 Claims. (Cl. 260—37)

This invention relates to integral, solid, uniform compositions of matter comprising a substantial amount of particles of an inorganic crystalline material comprising substantially barium sulfate and a minor amount of a resinous material comprising substantially a cured, formulated epoxy resin. More particularly, this invention relates to compositions useful as radiation shielding materials. Further, this invention relates to novel methods for the preparation of the above compositions.

The prior art has long sought a method of producing integral compositions which contain a substantial amount of crystalline barium sulfate materials and a minor amount of a cured, formulated epoxy resin material. However, the prior art has found it impossible to incorporate substantial amounts (90–98% by weight) of these barium sulfate materials in a composition. However, the prior art has recognized that such materials, could they be produced, would have great utility in many areas such as for instance floor tiles and abrasive wheels and the like.

The prior art has further sought a material which would function as a good radiation shield and yet have high structural strength. The prior art has used lead as such a shielding material. Lead has found extensive use as a radiation shielding material even in view of its limitations due to physical characteristics. In particular, lead is an extremely soft material which functions very poorly in structural applications. Walls or panels constructed of lead have a tendency to distort and move upon standing. Reinforcement of the lead with various materials does little to improve its structural characteristics. Further, the extreme density of this material requires that members or foundations on which it bears be very substantial. Thus, there is considerable expense involved in the installation of lead shielding.

Another material which has been used by the prior art in radiation shielding is concrete. While this material is much better than lead from a structural viewpoint, it is nowhere near as good as lead as a radiation shield. However, it must be used in many applications where the structural requirements are such that lead could not be used.

It can thus be seen that there is a need for compositions of matter which contain substantial amounts of barium sulfate materials. Further, it can be seen that there is a need for radiation shielding materials which have good radiation shielding properties and which have structural properties equal to or superior to concrete.

It is therefore an object of this invention to provide useful, novel, integral, solid, uniform compositions of matter which contain substantial amounts of a material comprising substantially barium sulfate.

It is further an object of this invention to provide novel methods for the preparation of these novel barium sulfate material compositions.

Further still, it is an object of this invention to provide novel compositions which have excellent radiation shielding properties, which have extremely high structural strengths and which have densities comparable to concrete.

These and other objects of this invention will become increasingly apparent to those skilled in the art as the description proceeds.

This invention relates to an integral, solid, uniform composition of matter which comprises a substantial amount of particles of a solid, inorganic, crystalline material comprising substantially barium sulfate and a minor amount of a solid resinous material comprising substantially a cured, formulated epoxy resin. Further, this invention relates to compositions which comprise a substantial amount of particles of a material comprising substantially barium sulfate, a minor amount of a powdered, complex, hydrous aluminum silicate and a minor amount of a cured formulated epoxy resin.

Further, this invention relates to the method of producing an integral, solid, uniform composition of matter which comprises mixing a substantial amount of particles of an inorganic, crystalline material comprising substantially barium sulfate with a minor amount of liquid resinous material comprising a formulated epoxy resin to form a uniform mixture A and subjecting the mixture A to extreme pressure to form an integral, solid, uniform composition of matter. Further still, this invention relates to the method of dispersing a minor amount of a liquid resinous material comprising substantially a formulated epoxy resin in particles of an inorganic, crystalline material comprising substantially barium sulfate which comprises mixing a substantial amount of particles of the inorganic crystalline material with a minor amount of a material comprising substantially a powdered, complex, hydrous aluminum silicate to form a mixture A and mixing the mixture A with a minor amount of the liquid resinous material to form a mixture B which comprises a uniformly dispersed resinous material in the crystalline material. Further, this invention relates to the subjecting of the mixture B to extreme pressure to produce an integral, uniform, solid product.

A substantial amount of the inorganic, crystalline materials of this invention is between 90–98 parts by weight. A minor amount of the formulated epoxy resin materials of this invention is between 2–10 parts by weight. A minor amount of the aluminum silicate hydrate materials of this invention is 1–5 parts by weight.

The compositions of this invention were produced by mixing a material comprising substantially barium sulfate with a liquid formulated epoxy resin and subjecting the mixture to extreme pressure. In the process of subjecting this material to extreme pressure, the volume was reduced. The result was a uniform, integral composition of matter of high density. Illustrative of the method for producing the compositions of this invention is Example I.

EXAMPLE I

Beneficiated barytes was used, having the following composition:

| | Percent |
|---|---|
| Barium sulfate (minimum) | 96 |
| Silica (SiO$_2$) | 1.102 |
| Ferric oxide (Fe$_2$O$_3$) (minimum) | 1 |
| Mixture at 105–6° C. | Trace |

The barytes had a screen analysis as follows:

| | Percent |
|---|---|
| Greater than 16 mesh (approx.) | 0.25 |
| Between 16 and 100 mesh | 70–75 |
| Less than 100 mesh | 25–30 |

This material was crystalline and was quite hard. Microscopically it was revealed that the crystals of this material formed an irregular eleven-sided figure.

A formulated epoxy resin was added to the barytes. Ninety-two (92) parts by weight of barytes were combined with eight (8) parts by weight of a liquid formulated epoxy resin and mixed thoroughly to form a uniform mixture. It was found that the mixing in this step must be very carefully done in order to produce a product in the subsequent steps.

The mixture was then subjected to a pressure of 28,000 pounds per square inch by means of a hydraulic press. The volume of the mixture was reduced by twenty-three percent (23%) of its original volume. During the application of pressure, the contained vapors in the mixture were allowed to escape.

The resulting product was a dense, uniform, integral composition of matter.

EXAMPLE II

The beneficiated barytes of Example I was used.

Ninety-two (92) parts of the barytes were mixed with two (2) parts of the powdered aluminum silicated hydrate, kaolin, the mixture was carefully blended (mixed) to insure uniformity of distribution. The mixture was then carefully blended with a liquid formulated epoxy resin as in Example I.

This mixture was then subjected to a pressure of 100,000 pounds per square inch while venting any contained gases. The volume was reduced by forty-four percent (44%).

The resulting product was a dense, uniform, integral composition of matter. It was almost twice as compact as the product of Example I.

Examples I and II were repeated using ordinary barytes with equal results in terms of uniformity of product. In fact, any solid inorganic crystalline material comprising substantially barium sulfate can be used.

It was found in using the formulations of Example I that a maximum of about 40,000 pounds per square inch could be used before reducing the mass subjected to pressure to a powder. An attempt was then made to find a method which would allow for greater pressures and therefore greater compaction. Many materials were tested; however, it was found that the complex hydrous aluminum silicates were the only suitable materials. Suitable silicate materials of this class were for instance kaolin, bentonite, fullers earth, pseudobentonites and ceramic clays in powdered form. It was found that kaolin was preferred. Further, it was found that the hydrated aluminum silicate must be carefully mixed with the crystalline materials in order to insure distribution of the epoxy resin when added and to produce a uniform product. The pressures were then increased to 120,000 pounds per square inch by this method. This is the method of Example II which is preferred. Further, it was found that no piping (pockets) was present in the finished product of Example II. The product of Example I did exhibit some piping. The product of Example II is thus preferred.

The extreme pressures of this invention can go as low as 10,000 pounds per square inch. With the compositions of Example I 20,000–35,000 pounds per square inch is preferred. With the compositions of Example II 80,000–120,000 pounds per square inch is preferred. The pressure range between about 10,000–120,000 pounds per square inch is the preferred extreme pressure range.

When energy is introduced into the system by other means along with the pressure, as by increased temperature, by radiation or by sound waves, for instance, the pressure requirements may be reduced somewhat from the preferred ranges. However, all of these are within the scope of the present invention so long as pressure is used above 10,000 pounds per square inch.

The methods of Examples I and II were repeated using various percentages of the beneficiated barytes. It was found that a sample with a maximum of about ninety-two percent barytes could be prepared without the hydrated aluminum silicate powder. However, it was found that by using the method of Example II a maximum of ninety-eight (98) percent beneficiated barytes could be used. This is an advantage since the resin content was thereby reduced, thereby reducing the cost of the final product.

Further, the product itself was more uniform as stated above.

The formulated resins used had a pot life of several days to facilitate handling and use in the process. Thus, a typical epoxy resin formulation of epoxy resin plus triethylene tetramine (TETA) was used. In addition, other materials which increased pot life were used.

The typical epoxy resin is the diglycidyl ether of bisphenol A. One such epoxy resin which was used in Examples I and II is DER 334$_{tm}$ made by the Dow Chemical Company. It has the following characteristics:

Physical state _____ Liquid
Color 25° C. Gardner (maximum) _____ 5
Epoxide equiv. _____ 179–194
Viscosity at 25° C. centipoises _____ 500–900

There are many other liquid epoxy resins manufactured by other companies which would work equally as well. The primary curing agent used was triethylenetetramine (TETA); however, other amine curing agents can be used. Decelerating catalysts were used to lengthen the room temperature pot life. A suitable catalyst was the boron trifluoride monoethylamine complex. Other such amine complexes are suitable. Such decelerating catalysts are preferred in the epoxy resin formulations of this invention in order to insure the production of a uniform product. Various flameproofing materials may be incorporated in the resin formulations used in the processes of this invention.

It was found that the preferred formulated epoxy resin contained 47 parts by weight of the decelerating catalyst per 100 parts by weight of the epoxy resin and 13 parts by weight of the curing agent per 100 parts by weight of the epoxy resin. However, the amount of curing agent and decelerating catalyst can be easily adjusted by those skilled in the art to produce formulated epoxy resins which are suitable. It is preferred to mix the decelerating catalyst with the epoxy resin and then add the curing agent. This order is preferred to prevent violent exotherms.

It was found that it was preferred to let the formulated epoxy resin stand for about three minutes before proceeding in the process. When this was done, the product formed was more uniform.

The equipment used in the processes of Examples I and II was a hydraulic press with an upper pressure limit of 120,000 pounds per square inch. The pressure applied was regulated to the experimental level desired. The mixtures to be compressed were added to a cylindrical steel matrix having a parting or release agent coating on its inside surface (3″ inside diameter), leaving some unfilled space at the top. A steel plunger was fitted to the container. This plunger was .005 inch undersize with respect to the inside diameter of the matrix. This allowed for the escape of gaseous vapors from the mixture as it was compressed. On a larger scale, the shape could be made to fit the desired needs. Variations might include the use of large platen presses. Provision for the escape of gases can be made by placing holes in various parts of the bearing plates. All of these variations are within the skill of the art.

The crystalline materials of this invention are or come from naturally occurring materials. The amount of ferric oxide is maintained at at least one percent (1%) in some of the materials and these are generally called beneficiated materials. These beneficiated barytes materials produce a composition which is far superior to compositions formed with the ordinary barytes materials in terms of strength. It is believed this is because of the presence of a small amount of ferric oxide in the beneficiated materials. Thus, the beneficiated barytes materials of this invention contain not less than one percent (1%) ferric oxide and are preferred. The beneficiated materials are generally waste materials from a process for preparing barium sulfate which are crushed to the desired particle size. The term barytes itself generally characterizes crystalline barium sulfate materials. All such materials are substantially barium sulfate.

The beneficiated barytes material was used in Examples I and II in the particle size range of between 16 and 100 mesh and this is the preferred range. However, larger or smaller sizes can easily be accommodated in the methods and compositions of this invention. The method of the present invention is adaptable to converting larger amounts by weight of the formulated epoxy resin per amount by weight of the barytes materials into the compositions of this invention. In this instance, the excess resin is bled out of the product while pressure is being applied. However, the product so formed is not as uniform as in the case where the resin is not bled out while the pressure is being applied as in Examples I and II.

There are many variations in resin formulation, silicate materials, operating conditions, etc. that may be made and all are within the skill of the art when the foregoing description is understood.

The compositions of this invention have unexpectedly been found to be useful as radiation shielding materials. This is particularly true of those compositions incorporating beneficiated barytes having the composition shown in Examples I and II. The testing of these materials has resulted in the conclusion that the compositions of this invention are much better than concrete and approach lead as to shielding properties. Further, the compositions of this invention have much better structural strength than lead and actually are better in some respects than concrete.

Illustrative of the testing are the results obtained when a product produced by the method of and having the composition of Example II was subject to various intensities of X-rays. Film X-ray plates were placed beneath the sample to determine whether there was any penetration of the X-rays. The results of these tests are as follows:

Test No. 1

Lead—5 mm. thick _____ kv__ 86
Test material—13 mm. thick _____ ma__ 300
Screens were used (time) _____ sec__ 2/5
Target distance 25″ _____ ma.s__ 120
Result: No penetration.

Test No. 2

Lead—5 mm. thick _____ kv__ 86
Test material—13 mm. thick _____ ma__ 300
Screens were used (time) _____ sec__ 2
Target distance 25″ _____ ma.s__ 600
Five times the radiation of Test No. 1.
Result: No penetration.

Test No. 3

Lead—13.9mm. thick _____ kv. 86.
Test block to 23.4 mm. thick ___ ma.s. 1,000.
Target distance 25″ _____ No screens were used.
Eight times the radiation of Test No. 1.
Result: No penetration.

Test No. 4

Test block—23.5 mm. thick _____ ma. 25.
Lead—13.9 mm. thick (time) _____ 2 min., 10 sec.
Target distance—50 cm. _____ ma.s. 3250
More radiation than in previous tests
 and at a higher energy _____ kv. 220.
Result: No penetration.

Test No. 5

Test block—23.5 mm.
 thick _____ Lead block—13.9 mm. thick.
20 mg. radium _____ Distance—1½ meters.
Result: No penetration.

Test No. 6

Test block—12.7 mm. thick _____ kv__ 200
Distance—80″ _____ ma__ 25
Time—8 min. (480 sec.) _____ ma.s__ 12,000
More radiation than previous tests.
Result: No penetration.

The results obtained in Tests 1–6 illustrate the general effectiveness of the compositions of this invention in shielding radiation. Further, testing with more elaborate equipment was conducted to determine the relative effectiveness of test materials of the type used in Tests 1–6 as against lead. The results of these tests are as follows:

Density of test sample _____ gm./cm.$^3$__ 3.43
Thickness of sample _____ cm__ 1.27
Weight/area (thickness) _____ gm./cm.$^2$__ 4.356

Test No. 7

*Cobalt-60 source.*—Lead foils 0.006″ thick were used in this test. It was found that one thickness of the material tested attenuated radiation the same as 20 lead foils. Therefore, 4.36 gms./cm.$^2$ of the material was equivalent to 3.46 gm./cm.$^2$ of lead in radiation attenuation.

It was found that two thicknesses of the test material attenuated the same amount of radiation as 45 lead foils. Therefore, 8.71 gm./cm.$^2$ of the material tested is equivalent to 7.78 gm./cm.$^2$ of lead.

The detection equipment was a Vibron Electrometer$_{TM}$ made by Electronics Instruments, Ltd. The test materials were three meters from a carbon dioxide filled, graphite wall, ionization chamber connected to the Electrometer. The source developed a gamma radiation energy of 1.1 mev.

Test No. 8

*Radium source.*—The procedure and equipment of Test No. 7 was used. It was found that one thickness of the material tested attenuated the same radiation as 26 foils of lead (0.006″). Therefore, 436 gm./cm.$^2$ of the material produced the same attenuation as 4.49 gm./cm.$^2$ of lead.

The energy of the gamma radiation developed in this test was 2.2 mev.

Test No. 9

*250 kvp. X-ray source.*—Standard high energy X-ray equipment was used. In particular an OX–250$_{TM}$ General Electric industrial X-ray unit was used. No allowance was made for scatter.

It was found that one thickness of the material tested attenuated the same radiation as 9 foils of lead (0.006″). Therefore, 4.356 gm./cm.$^2$ of the test material attenuated the radiation as well as 1.55 gm./cm.$^2$ of lead.

Two thicknesses of the material tested attenuated the radiation the same as 15 foils of lead. Therefore, 8.712 gm./cm.$^2$ attenuated the X-ray beam as well as 2.597 gm./cm.$^2$ of lead.

As can be seen from Tests 7–9, the test material compared very favorably to lead at the very high energies of radiation. However, at the lower energies the test materials were not as effective as lead. However, at all energies the test material performs much better than concrete.

Half value layers were determined for the test materials at various energies and compared to concrete and lead. This value is defined as the thickness of a material required to reduce the emergent radiation to one half the dosage rate of the incident radiation.

The results of this determination were as follows:

TABLE I.—HALF LAYER VALUES (MM.)

| Source | Test Material | Concrete | Lead |
| --- | --- | --- | --- |
| 80 kv. X-ray | 0.35–0.4 | 15 | 0.2 |
| 120 kv. X-ray | 0.6–0.8 | 20 | 0.25 |
| Cesium 137 (gamma) (high energy) | 21 | 48 | ≅21 |
| Cobalt 60 (gamma) (high energy) | 38 | 66 | ≅38 |

As can be seen from Table I, the test materials compare favorably to lead at the high energies and are almost twice as effective as concrete. At the lower energy levels, the test material was far superior to concrete and almost as good as lead.

As can be seen from the foregoing data, the compositions of this invention, particularly those containing beneficiated barytes, have very superior shielding properties, much better than concrete. Concrete is used for structural purposes because of the weaknesses of lead. It has been found that the compositions of this invention have very superior structural properties, in some respects better than concrete. It was also found that upon aging the shielding properties of the compositions of this invention improved. It is believed that this is because of a post curing process taking place in the sample.

The compositions of this invention have a density of 3.43 gm./cm.$^3$ about the same as concrete. Lead has a density of 11.342 gm./cm.$^3$. Thus, the compositions of this invention are much easier to support on bearing members than lead.

The compositions of this invention were subjected to the standard concrete crushing strength test. A total of 12,857 pounds per square inch was exerted on a sample, the limit of the testing equipment, with no visible effect. Thus, the materials of this invention have a crushing strength in excess of any standard concrete. Further, the materials of this invention can be reinforced with steel as desired. Thus, structural members comparable to or better than concrete can be made by the methods of this invention.

Thus, it can be seen that the compositions of this invention can be used in structural applications and in particular in radiation shielding applications as structural members.

Because of the great strength of the compositions of this invention, they have many uses. Grinding and polishing wheels can be made. Floor tiles of great strength and wear resistance can be made for example. There are many other uses which would be apparent to those skilled in the art.

A cost advantage is obtained because of the large amount of the barium sulfate materials used in the compositions of this invention. The principal component may be the natural barytes ore which finds little commercial usage and is thus inexpensive. The beneficiated materials are less expensive. Expense is minimized because of the small amount of epoxy resin used, particularly in the preferred compositions. Thus, there is a valuable economic advantage resulting from the use of the compositions of this invention.

Having particularly disclosed the methods and compositions of this invention, it is intended that this invention be limited only by the hereinafter appended claims.

I claim:
1. The method of producing an integral, solid, heterogeneous composition of matter which comprises:
   (a) mixing 90–98 parts by weight of particles of an inorganic crystalline material comprising substantially barium sulfate with 2–10 parts by weight of a liquid resinous material comprising substantially an epoxy resin composition prepared from a liquid epoxy resin which is a polymeric diglycidyl ether of bisphenol A, an epoxy resin amine curing agent and up to about 47 parts by weight of a boron trifluoride amine complex decelerating catalyst per 100 parts by weight of the liquid epoxy resin to form a uniform mixture; and
   (b) subjecting the mixture to extreme pressure between about 10,000–40,000 pounds per square inch and allowing any gases to escape thereby reducing the volume to form the integral, solid, heterogeneous composition of matter.

2. The method of producing an integral, solid, heterogeneous composition of matter which comprises:
   (a) mixing 90–98 parts by weight of particles of an inorganic crystalline material comprising substantially barium sulfate with 1–5 parts by weight of a material comprising substantially a powdered, complex, hydrous aluminum silicate selected from the group consisting of kaolin, bentonite, fullers earth, pseudobentonites, and ceramic clays to form a uniform mixture A;
   (b) mixing the mixture A with 2–10 parts by weight of a liquid resinous material comprising substantially an epoxy resin composition prepared from a liquid epoxy resin which is a polymeric diglycidyl ether of bisphenol A, an epoxy resin amine curing agent and up to about 47 parts by weight of a boron trifluoride amine complex decelerating catalyst per 100 parts by weight of the liquid epoxy resin to form a uniform mixture B; and
   (c) subjecting the mixture B to extreme pressure between about 10,000–120,000 pounds per square inch and allowing any gases to escape thereby reducing the volume to form the integral, solid, heterogeneous composition of matter.

3. The method of claim 2 wherein the aluminum silicate is kaolin.

4. The method of claim 2 wherein said crystalline material is purified barytes.

5. The method of producing an integral, solid, heterogeneous composition of matter comprising a resin impregnated barium sulfate material which comprises:
   (a) mixing 90–98 parts by weight of a particle of crystalline material comprising beneficiated barytes with 1–5 parts by weight of a material comprising substantially a powdered, complex, hydrous aluminum silicate selected from the group consisting of kaolin, bentonite, fullers earth, pseudobentonites, and ceramic clays to form a uniform mixture A;
   (b) mixing the mixture A with 2–10 parts by weight of a liquid epoxy resin composition prepared from a liquid epoxy resin which is a polymeric diglycidyl ether of bisphenol A, about 13 parts by weight of an epoxy resin amine curing agent and about 47 parts by weight of a boron trifluoride amine complex decelerating catalyst per 100 parts by weight of the diglycidyl ether of bisphenol A to form a uniform mixture B; and
   (c) subjecting the mixture B to extreme pressure between about 10,000–120,000 pounds per square inch and allowing any gases to escape thereby reducing the original volume by about 44% to form an integral, solid, heterogeneous composition of matter.

6. The method of claim 5 wherein said aluminum silicate is kaolin.

7. The method of producing an integral, solid, heterogeneous composition of matter comprising a resin impregnated barium sulfate material which comprises:
   (a) mixing between about 90 and 95 parts by weight of particles of a crystalline material comprising purified barytes with between about 1 and 3 parts by weight of a material comprising substantially a powdered, complex, hydrous, aluminum silicate selected from the group consisting of kaolin, bentonite, fullers earth, pseudobentonites, and ceramic clays to form a uniform mixture A;
   (b) mixing the mixture A with between about 4 and 9 parts by weight of a liquid epoxy resin composition prepared from a liquid epoxy resin which is a polymeric diglycidyl ether of bisphenol A, about 13 parts by weight of an epoxy resin amine curing agent and about 47 parts by weight of a boron trifluoride amine complex decelerating catalyst per 100 parts by weight of the liquid epoxy resin to form a uniform mixture B; and (c) subjecting the mixture B to between about 80,000 to 125,000 pounds per square inch and allowing any gases to escape thereby reducing the volume to form an integral solid, heterogeneous composition of matter.

8. The method of claim 7 wherein the volume is reduced by about 44%.

9. The method of claim 7 wherein said aluminum silicate is kaolin.

References Cited

UNITED STATES PATENTS

| | | | |
|---|---|---|---|
| 2,773,043 | 12/1956 | Zukas | 260—37 |
| 2,829,982 | 4/1958 | Hoyt. | |
| 3,144,421 | 8/1964 | Yost | 260—37 |

OTHER REFERENCES

Epoxy Resins, Skeist, Plastic application series, 1958, p. 158, Reinhold Publishing Co.

The Condensed Chemical Dictionary, Sixth Ed. Reinhold, 1961 (pp. 125 and 129 relied on).

Lee et al.: "Epoxy Resins," McGraw-Hill, 1957 (pp. 15, 111–113, and 150 relied on).

Shreve: "Chemical Process Industries," McGraw-Hill, 1956 (pp. 439 and 510 relied on).

MORRIS LIEBMAN, *Primary Examiner.*

A. H. KOECKERT, J. FROME, *Assistant Examiners.*